Patented Mar. 6, 1951

2,543,764

UNITED STATES PATENT OFFICE 2,543,764

DIARALKYL CARBINYL ESTERS OF DIALKYLAMINO ALKANOATES AND THE PRODUCTION THEREOF

John W. Cusic, Skokie, Ill., assignor to G. D. Searle & Co., Skokie, Ill., a corporation of Illinois No Drawing. Application July 2, 1947, Serial No. 758,706

8 Claims. (Cl. 260—482)

This invention relates to esters of amino-substituted alkanoic acids with substituted beta-arylethanols, and to the preparation thereof. In particular it relates to compounds of the general formula

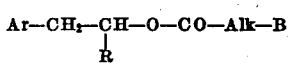

wherein Ar is an aryl radical, R is a non-aromatic hydrocarbon radical, Alk is a lower alkylene radical, and B is a secondary or tertiary aliphatic or aliphatic-type amino radical.

In the above formula, Ar represents aryl radicals such as phenyl, tolyl, halophenyl, anisyl, naphthyl, xenyl and the like, as well as aromatic heterocyclic radicals such as thienyl, pyridyl, furyl and related groups. The hydrocarbon substituent, R, may be an aliphatic group such as an alkyl or cycloalkyl radical or it may be an aliphatic-type group such as aralkyl. Among the aralkyl groups which R includes are benzyl, phenethyl and their alkyl-substituted derivatives. The secondary and tertiary aliphatic amino and aliphatic-type amino substituted alkanoic acids which make up the acid portion of these esters include mono- and di-alkylamino propionic, butyric and valeric acids as well as the corresponding piperidino-, pyrrolidino-, and morpholino-substituted lower fatty acids. The amino group is preferably located at the beta or gamma positions of such acids, which furthermore may have straight or branched chains which may also carry additional alkyl substituents. Among the aliphatic amino groups which are represented by B are mono- and dialkylamino groups and the corresponding hydroxylated and halogenated groups, such as the ethyl-beta-hydroxy-ethylamino, ethyl-beta-chloroethylamino, methylpropylamino, ethyl-gamma-bromopropylamino, butylamino, and methyl-beta-hydroxypropylamino groups and similar amino radicals. The aliphatic or aliphatic-type groups which are substituted upon the amino nitrogen atom may be the same or different. The amino groups are derived from strong primary or secondary organic bases of the aliphatic series or of the aliphatic-type heterocyclic series which have ionization constants in the range of $10^{-3}$ to $10^{-6}$. From the foregoing discussion of the amino acids, it will be seen that the alkylene grouping, Alk, is a bivalent hydrocarbon radical derived from a saturated aliphatic hydrocarbon and is exemplified by radicals such as ethylene, propylene, trimethylene, tetramethylene, the 1,2- and 2,3-butylenes, and amylene radicals. From the discussion of the amino acids, it is also apparent that the amino grouping, B, represents an aprimary alphyl amino radical such as secondary and tertiary aliphatic amino groups and tertiary heterocyclic amino groups which are aliphatic in character.

The esters which comprise this invention can be prepared by reacting a halogen-substituted fatty acid halide with a substituted beta-arylethanol with the formation of a halo ester. While I prefer to use chloro acids or chloro acid chlorides, I have found that bromo and, in certain instances, iodo acids can be used effectively. The resultant halo ester is further reacted with a primary or secondary aliphatic or aliphatic-type amine to form the desired amino acid ester. A preferred process of preparing esters of this type comprises heating together equivalent quantities of the substituted beta-arylethanol and haloalkanoic acid in the presence of benzene or toluene or other water-immiscible solvent having a boiling point relatively close to that of water, in such a way that a mixture of water and water-immiscible solvent distils from the reaction mixture. The conversion of the halogenated esters into the amino esters can be carried out by heating the halogenated esters with an excess of the atertiary amine in the presence or absence of solvent, using a closed system when necessary to retain volatile reagents.

The compounds which comprise my invention are of value as pharmaceutical agents. Certain of them are valuable antispasmodic or antihistaminic drugs. For such purposes the esters may be used either in the form of their bases or as salts with acids which in therapeutic dosages provide innocuous anions. The amino esters are generally only sparingly soluble in water. Among the acids which are suitable for forming salts of the bases are hydrochloric, hydrobromic, sulfuric, phosphoric, sulfamic, tartaric, citric, lactic, maleic, malic, acetic, benzoic, cinnamic, phenylacetic and the like. By the addition of alkyl, aralkyl, or alkylene halides, or esters of aromatic-sulfonic acids and sulfuric acid, there can be produced quaternary ammonium salts. Preferred compounds for this purpose comprise methyl chloride, methyl iodide, dimethyl sulfate, benzyl chloride, ethyl bromide and ethyl p-toluene-sulfonate. The acid addition salts are generally crystalline solids and since they exhibit the same physiologic properties as the free bases, they constitute a preferred form for the use of these compounds. It will be understood that the appended claims include the basic esters whether they be in the form of free bases or in the form of salts thereof.

My invention is further disclosed by the following examples, which are merely illustrative in nature and which in no way limit my invention in spirit or in scope.

Example 1

84.8 grams of dibenzylcarbinol and 40 g. of pyridine in 500 cubic centimeters of benzene are stirred and cooled in an ice bath while 50.8 g. of beta-chloropropionyl chloride in benzene is added dropwise. The reaction mixture is allowed to stand for about 15 hours and then treated with dilute mineral acid. The benzene layer is removed, dried and evaporated. The residue of dibenzylcarbinyl beta-chloropropionate is distilled at 230–245° centigrade at 40–45 millimeters.

45.3 g. of dibenzylcarbinyl beta-chloropropionate is reacted with a solution of 29.2 g. of diethylamine in 100 cc. of benzene at about 60–65° C. in a closed system for 48 hours. Then dilute acid is added and the benzene layer is removed. The acid layer is made alkaline, extracted with benzene, and the benzene extract dried and distilled. There is obtained thus dibenzylcarbinyl beta-diethylaminopropionate boiling at 185–200° C. at 3–4 mm. It has the structural formula

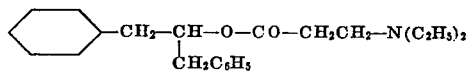

The hydrochloride is prepared by treating an ether solution of the base with alcoholic hydrogen chloride and recrystallizing the solid so obtained from ethyl acetate; melting point 101–102° C.

By a similar procedure using beta-chlorobutyryl chloride instead of beta-chloropropionyl chloride there is obtained dibenzylcarbinyl beta-diethylaminobutyrate, which has the structural formula

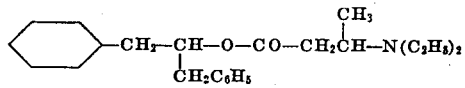

Example 2

30.2 g. of dibenzylcarbinyl beta-chloropropionate is heated at about 100° C. for 12 hours under pressure with a solution of 15 g. of dimethylamine in 250 cc. of toluene. The reaction mixture is extracted with dilute hydrochloric acid. The acid extract is made alkaline and extracted with ether. The ether extract is washed, dried with potassium carbonate, and evaporated. Dibenzylcarbinyl beta-dimethylaminopropionate distils at about 215° C. at 10 mm. and has the following structural formula

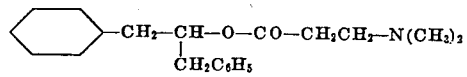

It forms a crystalline hydrochloride melting at 123–124° C. after recrystallization from isopropanol.

If 1-phenyl-2-hexanol is converted to the beta-chloropropionic acid ester by the method of Example 1 and the ester reacted with dimethylamine by the foregoing process, there is obtained the corresponding 1-phenyl-2-hexyl beta-dimethylaminopropionate having the structural formula

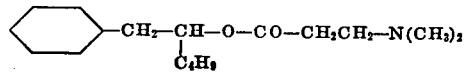

Example 3

63.6 g. of dibenzylcarbinol and 40 g. of pyridine in dry toluene are cooled and stirred in an ice bath while 50 g. of beta-chlorobutyryl chloride in dry toluene is added dropwise in 1 hour. The reaction mixture is allowed to stand for several hours. It is then treated with water. The toluene layer is separated, dried and distilled. Dibenzylcarbinyl beta-chlorobutyrate so obtained boils at 210–225° C. at 10 mm. 31.6 g. of this chloro ester and 17 g. of piperidine in 200 cc. of dry toluene are refluxed for two or three hours and allowed to stand for 10–15 hours. The reaction mass is filtered. The filtrate is extracted with dilute acid. The acid extract is made alkaline and back-extracted with ether. The ether extract is dried with potassium carbonate, evaporated and distilled. Dibenzylcarbinyl beta-piperidinobutyrate obtained in this manner boils at 210–240° C. at 4–5 mm. pressure and gives a colorless crystalline hydrochloride melting at 175–176° C. It has the structure

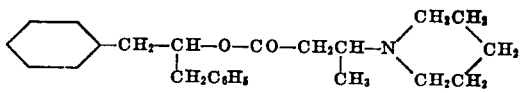

The subject matter of Examples 3 and 4 is disclosed and claimed in my copending application Serial No. 200,132, filed December 9, 1950.

Example 4

81.6 g. of methylbenzylcarbinol and 80.5 g. of N-ethylmorpholine are dissolved in 500 cc. of dry benzene and stirred and chilled in an ice mixture. To this solution is added 76.2 g. of beta-chloropropionyl chloride in 100 cc. of benzene over a period of 1 hour. The reaction mixture is allowed to stand overnight, then treated with dilute acid. The benzene layer is separated, dried over potassium carbonate, evaporated and distilled. There is obtained by this procedure methylbenzylcarbinyl beta-chloropropionate, boiling point 115–150° C. at 10–12 mm.

45.3 g. of this chloro ester is heated at 60°–70° C. for two days with a solution of 29.2 g. of diethylamine in 100 cc. of benzene. Dilute mineral acid is added and the organic layer is removed. The aqueous acid solution is made alkaline and extracted with ether. The ether is dried over potassium carbonate and evaporated. Methylbenzylcarbinyl beta-diethylaminopropionate distils at 152–155° C. at 3 mm. and has the formula

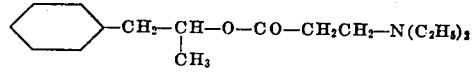

Its hydrochloride, prepared by treatment of a dry ethereal solution of the base with alcoholic hydrogen chloride, is a white crystalline solid melting at 97–99° C. after recrystallization from ethyl acetate.

Example 5

10 g. of dibenzylcarbinyl beta-diethylaminopropionate (Example 1) and 15 g. of methyl iodide are dissolved in 50 cc. of methyl ethyl ketone and heated in a pressure vessel at 60–70° C. for several days. Addition of ether causes precipitation of the methiodide, which after recrystallization from isopropanol, melts at 100–102° C.

Example 6

To a solution of 58 g. of 1-p-xenyl-2-propanol in 200 cc. of dry benzene and 24 g. of dry pyridine is added a solution of 42 g. of beta-chloropropionyl chloride in 100 cc. of dry benzene. The reaction mixture is then refluxed for 24 hours after which time a volume of dilute mineral acid approximately as large as the charge is added. The organic layer is separated, washed with water and then evaporated under reduced pressure. The residue of chloro ester thus obtained is heated in a closed vessel at 100° C. for 12 hours with 25 g. of dimethylamine in 250 cc. of dry toluene. The cooled reaction mixture is extracted with dilute hydrochloric acid. The acid extract is made alkaline and extracted with ether. The ether solution is washed, dried and evaporated. The residue of the beta-dimethylaminopropionic acid ester of 1-p-xenyl-2-propanol distils at 200–205° C. at 2 mm. It has the structural formula

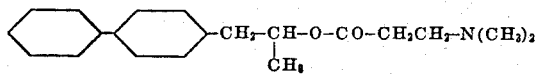

By a similar process starting with alpha-benzyl-beta-p-tolylethanol, there is prepared alpha-benzyl-beta-p-tolylethyl beta-dimethylaminopropionate, which has the formula

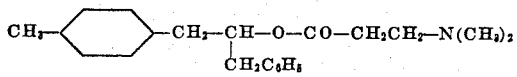

I claim:

1. A basic ester having the formula

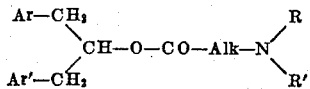

wherein Ar and Ar' are aryl hydrocarbon radicals of the group consisting of phenyl, xenyl and tolyl radicals, Alk is an alkylene radical containing not more than 3 carbon atoms, and R and R' are lower alkyl radicals, and salts thereof.

2. A dibenzylcarbinyl dialkylaminoalkanoate, having the formula

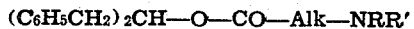

wherein Alk is a lower alkylene radical containing not more than three carbon atoms and R and R' are lower alkyl radicals, and salts thereof.

3. A dibenzylcarbinyl beta-dialkylaminopropionate, having the formula

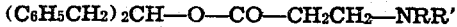

wherein R and R' are lower alkyl radicals, and salts thereof.

4. Dibenzylcarbinyl beta-dimethylaminopropionate, which has the formula

and salts thereof.

5. The process of preparing a dibenzylcarbinyl beta-dialkylaminopropionate which comprises heating a dibenzylcarbinyl beta-halopropionate with a lower dialkylamine.

6. The process of preparing dibenzylcarbinyl beta-dimethylaminopropionate which comprises heating dibenzylcarbinyl beta-chloropropionate with dimethylamine.

7. Dibenzylcarbinyl beta-dimethylaminopropionate hydrochloride.

8. The process of preparing a basic ester having the formula

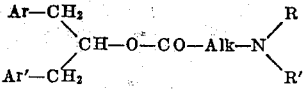

wherein Ar and Ar' are aryl hydrocarbon radicals of the group consisting of phenyl, xenyl, and tolyl, Alk is an alkylene radical containing not more than 3 carbon atoms and R and R' are lower alkyl radicals, which comprises heating an ester of the formula

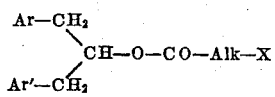

wherein X represents halogen, with a di(lower alkyl) amine.

JOHN W. CUSIC.

REFERENCES CITED

The following references are of record in the file of this patent:

UNITED STATES PATENTS

| Number | Name | Date |
|---|---|---|
| 2,370,015 | Dalmer | Feb. 20, 1945 |

FOREIGN PATENTS

| Number | Country | Date |
|---|---|---|
| 537,450 | Germany | Nov. 3, 1931 |

OTHER REFERENCES

Weil: Chem. Abst., vol. 18, page 2325 (1924).